United States Patent [19]

Foreman et al.

[11] Patent Number: 5,766,060
[45] Date of Patent: Jun. 16, 1998

[54] SPIRAL PATTERN ABRADING TOOL AND METHOD OF ABRADING

[76] Inventors: Randall Charles Foreman, 840 East 16th Avenue, Vancouver, B.C., Canada, V5T 2V6; Nadir Freedman, 202-3621 West 26th, Vancouver, B.C., Canada, V6S 1P2

[21] Appl. No.: 752,758

[22] Filed: Nov. 20, 1996

Related U.S. Application Data

[63] Continuation of Ser. No. 293,708, Aug. 22, 1994, abandoned.

[51] Int. Cl.⁶ .................................................. B24D 13/10
[52] U.S. Cl. ....................................... 451/63; 451/466
[58] Field of Search .............................. 451/63, 262, 283, 451/290, 466, 468, 469, 526, 530, 532, 539; 15/180

[56] References Cited

U.S. PATENT DOCUMENTS

| | | |
|---|---|---|
| 2,608,034 | 8/1952 | Fromson . |
| 3,384,915 | 5/1968 | Rands ........................... 451/466 |
| 3,456,401 | 7/1969 | Kushmuk . |
| 3,619,952 | 11/1971 | Leming et al. . |
| 3,696,563 | 10/1972 | Rands . |
| 3,871,139 | 3/1975 | Rands ........................... 451/466 |
| 4,561,214 | 12/1985 | Inoue . |
| 4,766,702 | 8/1988 | Kinner . |
| 4,825,596 | 5/1989 | Kinner ........................... 451/466 |
| 5,018,228 | 5/1991 | Bogaerts et al. .................... 451/63 |
| 5,353,553 | 10/1994 | Miller ........................... 451/63 |

FOREIGN PATENT DOCUMENTS

| | | |
|---|---|---|
| 197805 | 9/1976 | France . |
| 2365935 | 5/1978 | France ........................... 15/180 |

*Primary Examiner*—Robert C. Watson
*Attorney, Agent, or Firm*—Fulwider Patton Lee & Utecht, LLP

[57] ABSTRACT

A spiral pattern abrading tool applies a cross hatch pattern to a flat surface in a single pass rather than two passes as has been used in the past. The abrading tool comprising an abrading holder having a plurality of abrasion members flexibly mounted from pre-determined points on the holder. The points being arranged in a pattern with a series of arcs extending out from the center of the holder, the points spaced apart at pre-determined distances along the arcs such that rotation of the holder in either direction provides a spiral pattern of abrasion members. To apply the cross hatch pattern, the flat surface is rotated and the abrading tool rotated so that a spiral pattern is applied to the flat surface.

15 Claims, 3 Drawing Sheets

SPIRAL PATTERN ABRADING TOOL AND METHOD OF ABRADING

This application is a continuation of application Ser. No. 08/293,708 filed Aug. 22, 1994 now abandoned.

TECHNICAL FIELD

The present invention relates to applying a cross hatch pattern to a flat surface such as a disc brake rotor or flywheel and more specifically to an abrading tool that applies a cross hatch pattern to a flat surface using an abrasion holder with a plurality of abrasion members positioned in a pre-determined pattern of holes to provide a spiral pattern of abrasion members when the holder is rotated in either direction.

BACKGROUND ART

Disc brake rotors are machined on lathes and when new are machined to specification by grinding, cutting with carbide inserts, lapping, polishing or burnishing. A cross hatch pattern is required on disc brake rotors to assist in reducing noise such as groaning, squealing and shuddering when brakes are applied. This is particularly true today using improved brake pad material which is applied to disc brake rotors. It has been found that a cross hatch pattern provides a better dissipation of heat on the friction surface of the disc brake rotor and superior adhesion to the friction surfaces occurs when the pads and the disc brake rotors come together.

Disc brake rotors or flywheels are normally refinished on lathes, however this does not provide a good surface finish and at the present time, cross hatch patterns can not be applied to flat surfaces unless two passes of an abrasion tool are used. Sand-paper or emery paper can be used but such use is dangerous and can result in damage to the hands of a user.

Kinner in U.S. Pat. Nos. 4,766,702 and 4,825,596 shows a disc brake grinder for resurfacing flywheels with a concentric pattern. However their pattern of grinding is not a cross hatch pattern as may be seen in FIGS. 5 and 6. The concentric pattern does not provide significant noise reduction when applied to disc brake rotors.

Various types of abrading tools are available on the market. Rands in U.S. Pat. No. 3,696,563 shows an abrasive brush having bristles with fused abrasive globules. Fromson in U.S. Pat. No. 2,608,034 also shows an abrasive wire brush having abrasive heads. U.S. Pat. No. 4,561,214 to Inoue shows an abrading tool which has a face pattern for abrasion members. The patent is directed to dental applications.

DISCLOSURE OF THE INVENTION

It is the aim of the present invention to provide an abrading tool having an abrading holder or pad with a plurality of rods, bristles or globules in a specific pattern to be used for applying a cross hatch pattern on the flat face of a disc brake rotor, clutch flywheel or any flat surface that can be rotated. The pattern of bristles or globules is developed through a series of arcs extending from the center of the abrading holder with a pre-determined number of holes spaced at pre-determined positions on the arcs such that when the abrading holder is rotated in a clockwise or anti-clockwise direction a spiral pattern of abrasion members occurs.

The pattern is a unique congruent arrangement such that when the diameter or area of the abrading holder changes, then the pattern of holes for the bristles or globules changes in the same ratio such that spiral patterns occur when the abrading holder is rotated in either direction.

By having the pattern such that the left hand spiral and right hand spiral are substantially identical, one can rotate the disc brake rotor or flywheel in either direction and also have the abrading holder rotating in either direction thus avoiding the problem of having to ensure that either the lathe holding the flywheel or disc brake rotor rotates in one direction or the hand-held rotating device holding the abrading tool rotates in one direction.

The present invention provides a spiral pattern abrading tool for applying a cross hatch pattern to a flat surface comprising an abrading holder having a plurality of abrasion members flexibly mounted from pre-determined points on the holder, the points arranged in a pattern with a pre-determined number of points in a pre-determined series of arcs extending out from a center of the holder, the points spaced apart at pre-determined distances along the arcs such that rotation of the holder in either direction provides a spiral pattern of abrasion members.

The present invention also provides a method of applying a cross hatch pattern to a flat surface comprising the steps of rotating the flat surface, applying an abrading holder having a plurality of abrasion members to the rotating flat surface, the plurality of abrasion members flexibly mounted from pre-determined points on the holder, the points arranged in a pattern with a pre-determined number of points in a pre-determined series of arcs extending out from a center of the holder, the points spaced apart at pre-determined distances along the arcs, and rotating the holder in either direction to provide a spiral pattern of abrasion members applied to the rotating flat surface.

BRIEF DESCRIPTION OF DRAWINGS

In drawings which illustrate embodiment of the present invention.

MODES FOR CARRYING OUT THE INVENTION

Figure 1:
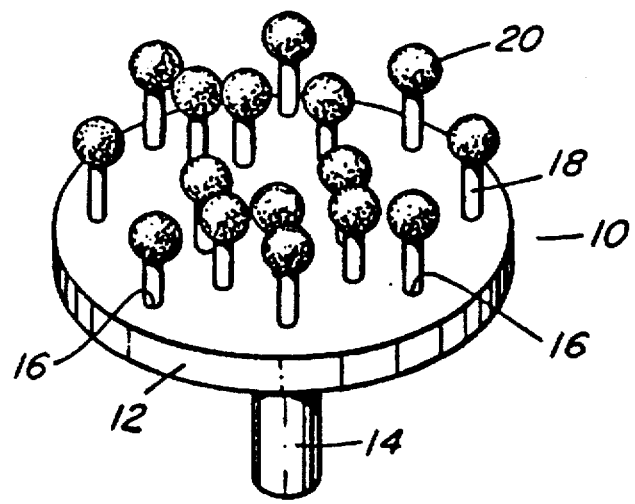
FIG. 1 is an isometric view showing an abrading tool according to one embodiment of the present invention with a plurality of abrasion members mounted on a holder.

A spiral pattern abrading tool 10 is shown in FIG. 1 having an abrading holder 12 supported from a spindle 14.

A pattern of holes 16 is arranged on the surface of the holder 12 in to which are placed flexible stems or mono filaments 18 having abrasive globules 20 thereon. The abrasive globules in one embodiment are similar to those shown in U.S. Pat. No. 3,696,563 to Rands. Whereas a mono filament is described herein it will be apparent that this could be plastic, steel or other suitable material. Furthermore it may be a multi filament such as a braided wire or plastic multi-filament member. The globules may be diamond coated or coated with other types of abrasive composition as desired for the particular application. The surface of the holder 12 is shown flat but may be domed as required with the mono filaments 18 having different lengths.

Figure 2:
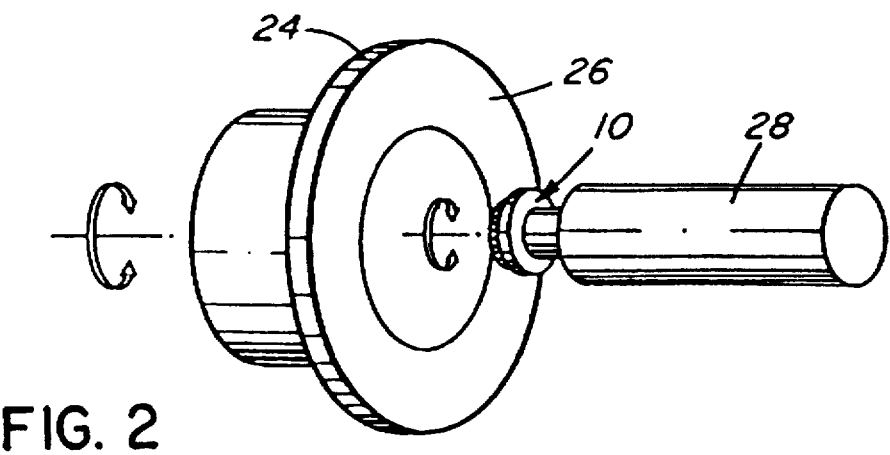
FIG. 2 is an isometric view showing a flywheel or disc brake rotor being rotated and a spiral pattern abrading tool being rotated and applied to the disc brake rotor or flywheel flat surface.
Figure 3:
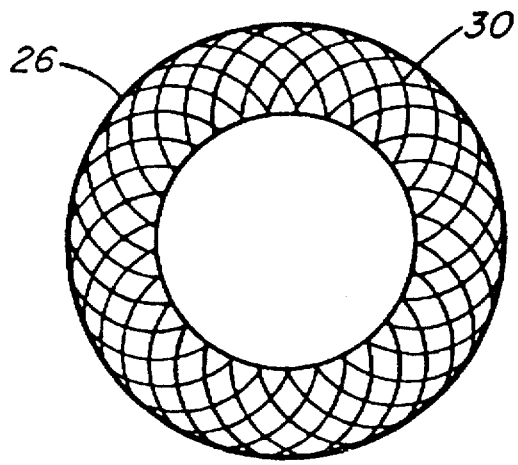
FIG. 3 is a plan view showing a cross hatch pattern on a disc brake rotor or flywheel as applied by the spiral pattern abrading tool of the present invention.

A disc brake rotor 24 having a flat surface 26 is shown in FIG. 2 is mounted on a lathe (not shown) which can be rotated either clockwise or anti-clockwise and a spiral pattern abrading tool 10 similar to that shown in FIG. 1, is attached to a rotating device which may be an air-drill, a pneumatic drill, an electric drill or other type of hand-held or even supported rotating device. The rotating abrading tool 10 is applied to the flat surface 26 of the disc brake rotor 24. The disc brake rotor 24 is rotated in either direction and the hand-held motor 28 rotates the spiral pattern abrading tool 10 in either direction. The rotation of the disc brake rotor 24 is generally in the range of about 50 to 500 rpm, preferably in the range of about 100–200 rpm when turning disc brake rotors or clutch flywheels on a lathe. The spiral pattern abrading tool 10 is rotated in the range of from 50 to 500 rpm. The pattern of abrasion members provides a cross hatch pattern 30 as shown in FIG. 3 on the disc brake rotor or flywheel surface 26. This cross hatch pattern is caused by the spiral pattern abrading tool and the arrangement of the abrasion members on the abrading holder 12.

Figure 4:
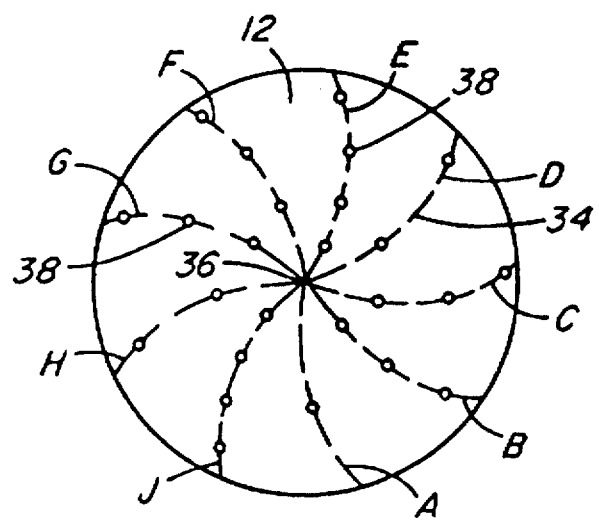
FIG. 4 is a plan view showing one embodiment of an abrading holder with a plurality of holes according to a pre-determined pattern arranged for abrasion members.
Figure 5:
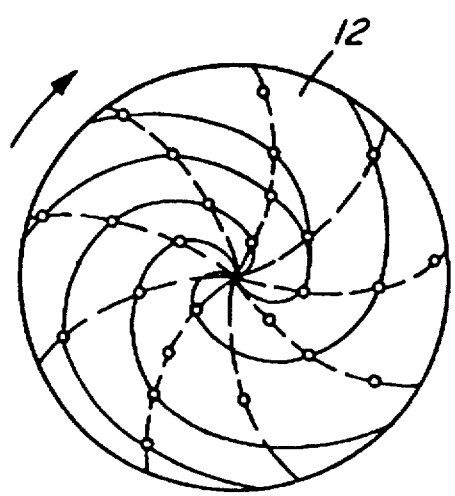
FIG. 5 is a plan view similar to that shown in FIG. 4 wherein the abrading holder is rotated in a clockwise direction showing the spiral pattern which is formed by the rotating pattern of holes.

FIG. 4 illustrates one embodiment of a pattern of holes or points on the holder 12 for mounting the abrasion members. As can be seen, there are three congruent variables for the pattern for each diameter of holder. The variables are the number of arcs 34, each arc extending from the center 36 of the holder 12 to the periphery and being equally spaced about the periphery, the number of holes 38 in each arc 34 and the spacing between the holes 38 on each arc 34. The spaces between the arcs are arcuate shaped wedges without bristles between the arcs, as is shown in FIG.4. This pattern is arranged so that when the holder 12 is rotated in a clockwise direction, as shown in FIG. 5, a spiral pattern is formed by these holes and when the holder 12 is rotated in the anti-clockwise direction, a similar spiral pattern is obtained although in the opposite rotation to that of FIG. 5. In both cases it is essential that the pattern of abrasion members or holes provide a spiral pattern when the holder 12 is rotated.

A specific pattern in a holder is shown in FIG. 4 and has nine arcs 34 lettered A, B, C, D, E, F, G, H and J. In one embodiment the holder is a 50.8 mm diameter (2 inches) and the pattern is arranged as follows. The nine arcs are spaced apart 18 mm on the circumference of the holder 12. Arc A has one hole spaced 12 mm in from the periphery, arc B and arc G each have three holes spaced 7 mm apart with the first hole spaced 7 mm from the center 36 of the holder 12. Arc C and arc F each have three holes spaced 8 mm apart with the first hole spaced 8 mm from the center 36. Arc D and arc H each have two holes spaced 11 mm apart with the first hole spaced 11 mm from the center 36. Arc E and arc J each have four holes spaced 6 mm apart with the first hole spaced 6 mm from the center 36.

Figure 4A:
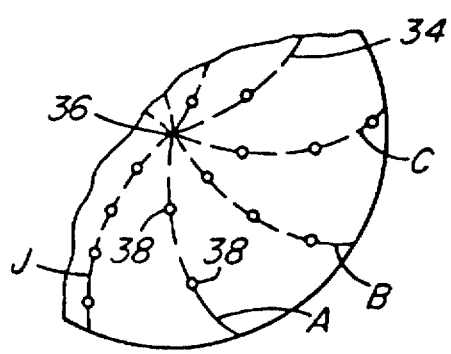
FIG. 4A is a partial plan view similar to FIG. 4 with a change in the number of holes in the first arc.
Figure 6:
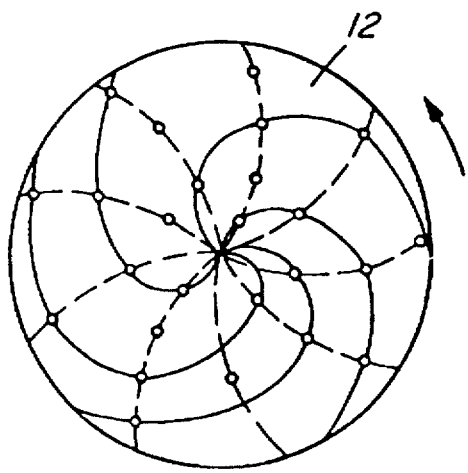
FIG. 6 is a plan view similar to FIG. 5 showing the abrading holder being rotated in an anti-clockwise direction.

In another embodiment, shown in FIG. 4A, arc A has two holes spaced 7 mm apart with one hole spaced 7 mm in from the periphery. Whereas the embodiments described herein are for a 50.8 mm holder, if a larger or smaller holder is required then the spacing ratio of the holes 38 according to the dimension for the 50.8 mm holder may be applied to different size of holders 12. It has been found that this particular pattern does provide the spiral pattern shown in FIGS. 5 and 6 when the holder is rotated either clockwise or anti-clockwise.

The abrasion members are shown in FIG. 1 extending at 90° from the surface of the holder 12, however, these abrasion members may extend at an angle ranging from 30° to 90° from the face of the holder depending on the particular requirements of the applicator. The flexible stems 18 should be able to flex a sufficient amount to press onto the flat surface to be abraded.

Figure 7:
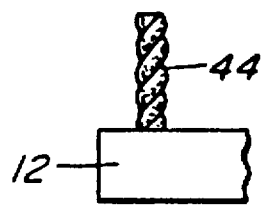
FIGS. 7, 8, 9, 10 and 11 are partial views of the abrading tool showing other types of abrasion members used for the abrading tool.
Figure 8:
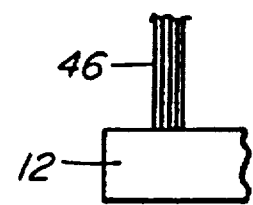
Figure 9:
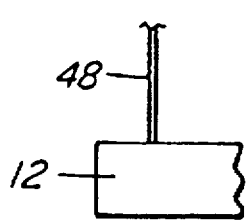
Figure 10:
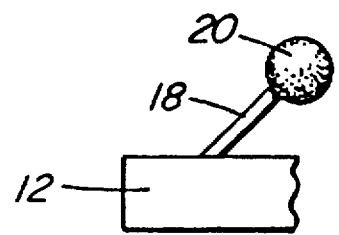
Figure 11:
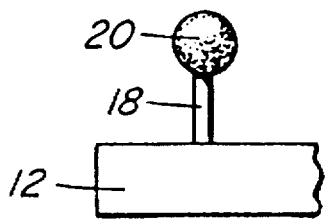

FIG. 7 illustrates an abrasion member 44 being in the form of a twisted tuft of bristles. FIG. 8 illustrates the abrasion member 46 being in the form of a tuft of non-twisted bristles and FIG. 9 illustrates the abrasive member 48 being a single mono filament or single bristle. The bristles may be spring steel or mono filament, multi-filament and other suitable abrasion members used. It is the pattern of holes that provides the important feature for the present invention. FIG. 10 shows an abrasive globule 20 on a stem mounted at about 45° from the surface of the holder 12, and FIG. 11 shows the same mounting arrangement as shown in FIG. 1.

By utilizing the spiral pattern abrading tool according to the present invention, a cross hatch pattern 30 as shown in FIG. 3 is provided on a disc brake rotor. This prevents the brake pads from moving up and down against the disc brake rotor itself and ensures that the pads sit or remain in their proper and desired position when in use. This then results in the ideal maximum surface to surface contact between the pads and the disc brake rotor which allows significantly less pedal force or less pressures to be exerted to affect the process of stopping. Stopping is thus more efficient and this is estimated as being as much as 20% as tests have shown from the perspective such as time, distance, wear and tear of auxiliary equipment.

The cross hatch pattern on the disc brake surface allows for faster stopping as the friction points do not generate as much heat and the heat produced is dissipated faster resulting in better adhesion between the pad and the disc brake surface or between a flywheel and clutch disc. This allows the brake mechanism or clutch mechanism to run cooler allowing for faster more effective stopping power or gripping power and less harmonic imbalance. The cross hatch pattern on the disc brake surface also greatly reduces the noise such as groaning, squealing or shuddering when brakes are applied in a vehicle. When a cross hatch pattern on a disc brake rotor is prepared according to the method of the present invention, no further steps may be required to clean up the fine residue remaining on the disc brake rotor surface. Furthermore, the cross hatch pattern is formed regardless of direction of rotation of the abrading tool by the hand-held rotating device or the rotation of the flat surface on which the cross hatch pattern is to be applied.

Various changes may be made to the embodiment shown herein without departing from the scope of the present invention which is limited only by the following claims.

We claim:

1. A spiral abrading tool for applying a cross hatch pattern to a flat surface comprising:

a round abrading holder having a flat surface, said abrading holder having a center and a plurality of abrasion members, flexibly mounted from pre-determined points on the holder, the points arranged in a pattern with a pre-determined number of points in a series of nine arcs, each of said arcs commencing at the center of the holder and extending to the periphery of the holder, the points spaced apart at pre-determined distances along the arcs such that rotation of the holder in either direction provides a spiral pattern of abrasion members permitting removal of abraded particles from said surface, the abrading holder having a diameter of 50.8 mm with said nine arcs numbered from one to nine anti-clockwise around the periphery from the center and spaced apart at about 18 mm around the circumference;

arc 1 having one hole positioned about 12 mm in from the periphery, arcs 2 and 7 each having three holes spaced apart about 7 mm, one hole spaced about 7 mm from the center, arcs 3 and 6 each having three holes spaced apart about 8 mm, one hole spaced about 8 mm from the center, arcs 4 and 8 each having two holes spaced apart about 11 mm, one hole spaced about 11 mm from the center, arcs 5 and 9 each having four holes spaced apart about 6 mm, one hole spaced about 6 mm from the center.

2. The spiral pattern abrading tool according to claim 1 wherein the pattern of arc 1 is changed and arc 1 has two holes spaced about 7 mm apart, one hole spaced about 7 mm in from the periphery.

3. The spiral pattern abrading tool according to claim 1 wherein the diameter of the holder is increased or reduced from 50.8 mm and the ratio of dimensions for positioning the arcs and positioning the holes on the arcs is exactly the same as the ratio for the 50.8 mm diameter holder.

4. The spiral pattern abrading tool according to claim 2 wherein the diameter of the holder is increased or reduced from 50.8 mm and the ratio of dimensions for positioning the arcs and positioning the holes on the arcs is exactly the same as the ratio for the 50.8 mm diameter holder.

5. A spiral pattern abrading tool for abrading a flat working surface with a cross-hatch pattern, comprising:

an abrading holder having a diameter D, a center, and a plurality of abrasion members flexibly mounted to a corresponding plurality of points on said holder, said plurality of points being arranged in a pattern of a plurality of arcs of points extending from said center;

a first one of said arcs of points including one point;

a second and seventh of said arcs of points consisting of three points spaced apart about a distance b, with one of said three points being spaced about a distance b from said center;

a third and sixth of said arcs of points consisting three points spaced apart about a distance c, with one of said three points being spaced about a distance c from said center;

a fourth and eighth of said arcs of points consisting of two points spaced apart about a distance d, with one of said two points being spaced about a distance d from said center;

a fifth and ninth of said arcs of points consisting of four points spaced apart about a distance e, with one of said four points being spaced about a distance e from said center;

where b is D*7 divided by 50.8;

c is D*8 divided by 50.8;

d is D*11 divided by 50.8; and e is D*6 divided by 50.8, whereby rotation of the holder in either direction provides a spiral pattern of abrasion members permitting removal of abraded particles from said working surface.

6. The spiral pattern abrading tool according to claim 5, wherein nine arcs are provided, each of said arcs commencing at the center of the holder and extending to the periphery of the holder, evenly spaced about the periphery.

7. The spiral pattern abrading tool according to claim 5, wherein said first arc of points consists of two points spaced apart about a distance a, with one of said two points being spaced about a distance a from said center, and wherein a is D*7 divided by 50.8.

8. The spiral pattern abrading tool of claim 5, wherein D is 50.8 millimeters.

9. The spiral pattern abrading tool of claim 5, wherein the abrasion members comprise abrasion coated globules on monofilament stems.

10. The spiral pattern abrading tool of claim 9, wherein the globules are diamond coated.

11. The spiral pattern abrading tool according claim 5, wherein the abrasion members are monofilament bristles.

12. The spiral pattern abrading tool of claim 5, wherein the abrasion members are multifilament tufts of bristles.

13. The spiral pattern abrading tool of claim 5, wherein the abrasion members are spring steel bristles.

14. The spiral pattern abrading tool of claim 5, wherein the abrasion members are mounted at an angle in the range of 30 to 90 degrees from a face of the holder.

15. A method of applying a cross hatch pattern to a flat working surface, comprising the steps of:

rotating the flat working surface;

applying an abrading holder having a diameter of D, a center, and a plurality of abrasion members flexibly mounted to a corresponding plurality of points on said holder, said plurality of points being arranged in a pattern of a plurality of arcs of points extending from said center, a first one of said arcs of points including one point; a second and seventh of said arcs of points consisting of three points spaced apart about a distance b, with one of said three points being spaced about a distance b from said center; a third and sixth of said arcs of points consisting of three points spaced apart about a distance c, with one of said three points being spaced about a distance c from said center; a fourth and eighth of said arcs of points consisting of two points spaced apart about a distance d, with one of said two points being spaced about a distance d from said center; a fifth and ninth of said arcs of points consisting of four points spaced apart about a distance e, with one of said four points being spaced about a distance e from said center, where b is D*7 divided by 50.8, c is D*8 divided by 50.8, d is D*11 divided by 50.8, and e is D*6 divided by 50.8; and rotating the holder in either direction to provide a spiral pattern of abrasion members permitting removal of abraded particles from said working surface.

* * * * *